United States Patent [19]

Villalobos et al.

[11] Patent Number: 4,644,326

[45] Date of Patent: Feb. 17, 1987

[54] UNITARY KEY PANEL

[75] Inventors: Luis Villalobos, Santa Monica; Steven B. Hirsch, Beverly Hills; Steven G. Hauser, Tarzana; John Von Buelow, Woodland Hills, all of Calif.

[73] Assignee: Secure Keyboards Limited, Costa Mesa, Calif.

[21] Appl. No.: 500,862

[22] Filed: Jun. 3, 1983

[51] Int. Cl.4 ............ H04L 1/00

[52] U.S. Cl. ............ 340/365 R; 340/365 E; 340/365 VL; 340/712; 340/568; 200/5 A; 200/302.2

[58] Field of Search ........ 340/365 R, 365 E, 365 VL, 340/712, 568; 200/5 A, 61.93, 159 B, 302.2, 302.1

[56] References Cited

U.S. PATENT DOCUMENTS

| | | | |
|---|---|---|---|
| 3,757,322 | 9/1973 | Barkaan | 340/712 |
| 3,890,480 | 6/1975 | Berling | 200/302.2 |
| 3,959,610 | 5/1976 | Finnegan | 200/5 A |
| 4,066,850 | 1/1978 | Heys | 200/5 A |
| 4,074,088 | 2/1978 | Keough | 200/5 A |
| 4,091,610 | 5/1978 | Sasaki | 200/DIG. 2 |
| 4,096,935 | 6/1978 | Hanakata | 340/365 R |
| 4,233,522 | 11/1980 | Grummer | 340/365 C |
| 4,333,090 | 6/1982 | Hirsch | 340/365 R |
| 4,336,529 | 6/1982 | Buan | 340/365 R |
| 4,339,634 | 7/1982 | Weber | 200/5 A |
| 4,352,968 | 10/1982 | Pounds | 200/302 |
| 4,421,966 | 12/1983 | Pounds | 200/5 A |
| 4,460,810 | 7/1984 | Fukukura | 200/5 A |

*Primary Examiner*—John W. Caldwell, Sr.
*Assistant Examiner*—Tyrone Queen
*Attorney, Agent, or Firm*—Poms, Smith, Lande & Rose

[57] ABSTRACT

An environmentally protected keyboard display and input device is provided which may be utilized in conjunction with a variety of digital control systems such as automated bank tellers or building security systems. The keyboard display and input device includes a unitary, transparent flexible keyboard having thickened portions forming keys. The keyboard forms an environmental seal including a peripheral gasket to protect an underlying, transparent, pressure sensitive switching assembly, which, in turn, overlies a corresponding visual display of alphanumeric characters which indicate the significance of the individual pressure sensitive switches and corresponding keys overlying each character. Pins are formed on the underside of the flexible keyboard, below each key, to focus and concentrate pressure exerted on each key to the corresponding pressure sensitive switch below. An optical grid is provided to restrict the viewing of the alphanumeric characters to the user of the device, to prevent compromising the data input.

16 Claims, 9 Drawing Figures

UNITARY KEY PANEL

FIELD OF THE INVENTION

The present invention relates generally to data input devices and, more particularly, to data input devices wherein manually actuated keys are utilized to input data.

BACKGROUND OF THE INVENTION

In the field of data input devices, manually operated units, wherein data is input in the form of electronic signals generated through the actuation of various types of data input keyboards, are known in the art. Typically, such devices employ a keyboard or a key pad composed of individual push-button type keys having character indicia permanently associated with each key position to indicate the value or meaning associated with the actuation of each particular key. Incidentally, assemblies using such arrangements are disclosed in U.S. Pat. No. 4,333,090 granted June 1, 1982 and in U.S. patent application Ser. No. 379,755 filed May 19, 1982.

It has also previously been proposed to use sheets of Mylar overlying switch input points and with suitable indications of the location of the switch input points, which may be arranged in a matrix configuration, similar to a key pad. However, the sheet Mylar material is very thin, in the order of a few thousandths of an inch thick, does not resemble a conventional key pad having individual molded keys, and does not have the ruggedness to withstand public usage or adverse environmental conditions.

Also, while data input devices utilizing such Mylar switching assemblies perform satisfactorily when operated by skilled users in controlled environments, such arrangements are not well suited for withstanding the rigorous environments associated with external uses such as those found in the operation of automated bank tellers or building security access systems, which by design may be located in outdoor environments, or may be subject to rain water or spillage from drinks or the like. In external environments, extremes of temperature, humidity and other weather factors, along with problems of vandalism and abuse by the operating public, can render such prior art input devices inoperative. Therefore, it is a primary objective of the present invention to provide a secure data input device that is resistant to the problems associated with operation in a rigorous, noncontrolled environment.

SUMMARY OF THE INVENTION

Accordingly, it is a principal object of the present invention to provide a data input keyboard type device that is fully operative and reliable under high moisture conditions, and/or despite exposure to the extremes of temperature and weather associated with an outdoor operating environment.

In accordance with a broad aspect of the invention, a keyboard assembly includes a unitary flexible keyboard made of a single sheet of flexible material, but with thickened and raised individual key portions giving the appearance of individual molded keys.

Subordinate features of this basic assembly include the inclusion of (1) actuation sites or electrical contacts underlying the key portions; (2) arrangements for designating the key portions with different alphanumeric characters; (3) the use of raised and separate key areas which are in the order of one-eighth inch thick and extend at least one-sixteenth of an inch high; and wherein (4) the outer edge of the sheet of flexible material constitutes a gasket for sealing the keyboard against moisture and liquids.

In accordance with a specific structural aspect of the invention, an environmentally protected secure keyboard display and input device is provided which utilizes a unitary flexible keyboard as an environmental seal overlying as array of input actuation locations which in turn correspond to an array of individually displayed alphanumeric characters denoting the value of each actuation location; the values being apparently randomly associated with the individual actuation location at various times throughout the input operation. Additionally, a light baffle or optical grid may be provided between the array of actuation locations and the array of character displays to prevent observation of the characters associated with the individual actuation locations during the input operation, by bystanders or unauthorized persons.

The unitary flexible keyboard disclosed is formed of a transparent plastic material to allow undistorted viewing of the associated value denoting characters displayed below each individual input location. For convenient operation, the unitary keyboard is provided with thickened portions forming keys which overlay each of the associated input actuation locations and corresponding character displays, to enable the keyboard of the present invention to be operated in the same manner as a conventional, multielement keyboard. However, unlike conventional multielement keyboard devices, the one piece plastic material utilized for the unitary keyboard of the present invention provides a degree of weather protection previously unavailable with conventional keyboards having gaps and seams between keys. Additionally, because the material forming the unitary keyboard will remain flexible throughout a continuum of temperatures, the data input device of the present invention will remain operational at temperatures ranging from below freezing to the high temperature associated with natural outdoor environment. Also, in order to provide an added degree of weather protection for the internal components of the data input device, the unitary flexible keyboard is shaped to form its own peripheral gasket surfaces to further seal internal electrical components of the device from being short circuited by moisture or precipitation or from being otherwise adversely affected by the hostile exterior operating environment.

Additionally, the unitary flexible keyboard is provided with a number of small postlike protrustions below each of the thickened key areas. These protruding pins serve to effectively transmit pressure exerted upon the individual keys, associated with data input corresponding in value or significance to the character assigned to and displayed beneath the key pressed, to the underlying corresponding actuation sites which translate the pressure into an electrical signal that can be sensed by the input device as data. Also, the actuating pins serve to prevent the possibility of simultaneous actuation of two actuation sites when adjacent keys are pressed at the same time. By focusing the input pressure onto a small area of the actuation site, the input pins prevent actuation unless pressure is exerted directly upon the key itself. Pressure exerted between adjacent keys will cause the keys to pivot about their respective underlying pins rather than to depress the pins directly.

Proper positioning of the pins, as will be discussed in detail below, serves to focus this between key pressure onto one actuation site rather than two.

Though flexible, the unitary plastic keyboard also serves to protect the interior components of the input device against physical abuse or vandalism because it is capable of resisting cuts or punctures, there are no moving parts to wear out or break, and there are no gaps or edges that can be pried or deformed. Additionally, an antitampering system is provided which will deactivate the input device (and thus shut down its associated function) if and when the keyboard face plate is removed.

It may be noted again that the unitary plastic keyboard is a valuable development, per se, even without the associated variable alphanumeric display; and could therefore be employed for conventional fixed keypad purposes, with opaque flexible plastic, for example, and with alphanumeric characters inscribed on each key location.

Other features and advantages of the present invention will become apparent from the following detailed description, taken in conjunction with the accompanying drawings, which illustrate, by way of example, the principles of the present invention.

DETAILED DESCRIPTION OF THE PREFERRED EMBODIMENT

Figure 1:
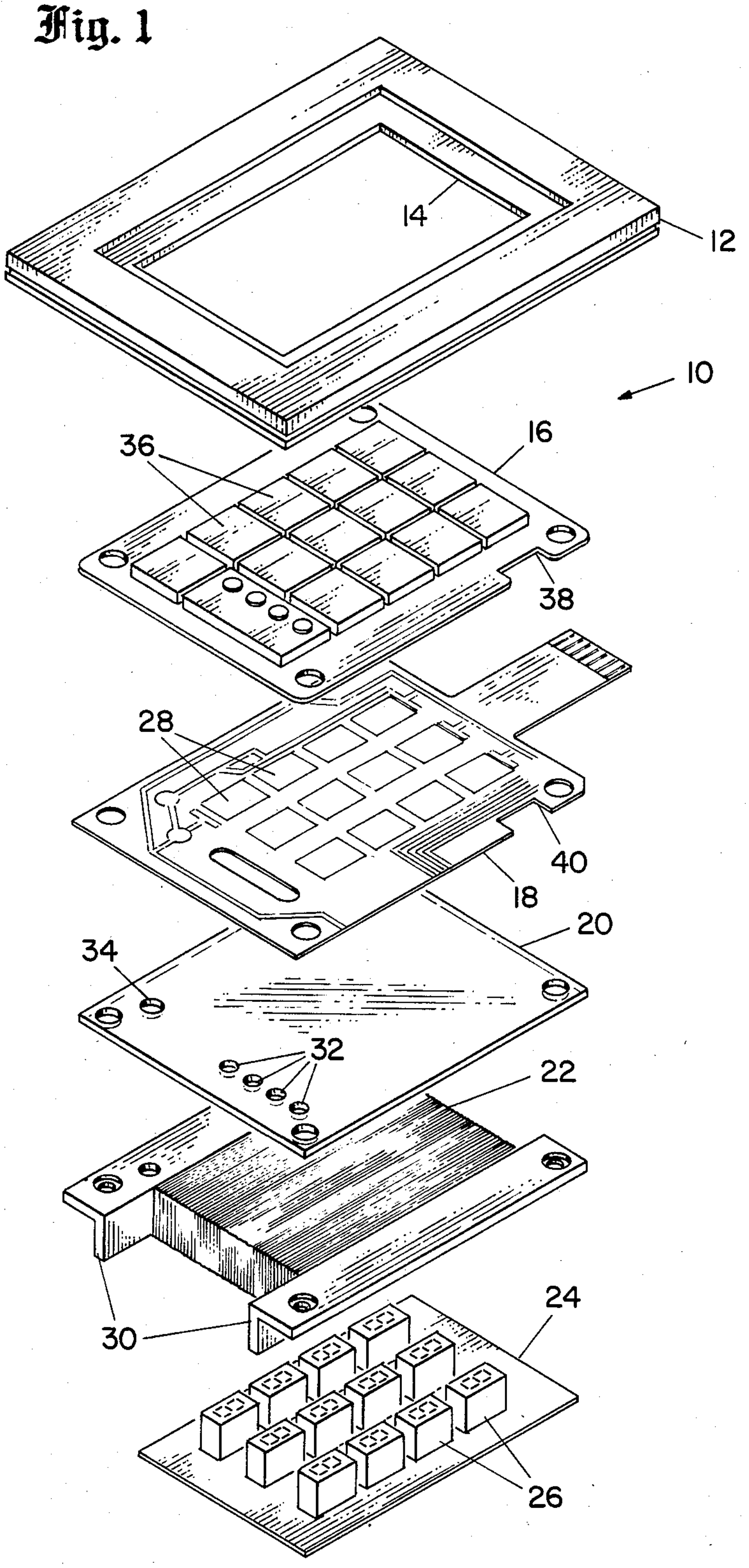
FIG. 1 is an exploded perspective view of a preferred exemplary embodiment of the present invention.

Referring more particularly to the drawings, FIG. 1 shows an exploded view of the preferred embodiment of a manually operated, secure, data input keyboard device, generally indicated at 10, illustrating the principles of the present invention. Data input device 10 is provided with an exterior frame 12, having a rectangular cutout 14 which enables frame 12 to mount over and secure a unitary flexible keyboard 16 while leaving the majority of keyboard 16 exposed through cutout 14 for operation and data input. As will be discussed in detail below, keyboard 16 serves to protect an underlying, transparent, multiple actuation site switching assembly 18. A transparent backing plate 20 is provided to support switching assembly 18 and to provide a smooth, uniform surface necessary for the proper actuation of the pressure sensitive actuation sites of switching assembly 18, as will be discussed in detail with reference to FIG. 8. Directly below backing plate 20 is optical grid 22 which serves to restrict the viewing angle of underlying multielement character display 24.

While it is preferred that character display 24 consist of an array of twelve 7-element light emitting diode units 26, it is contemplated that other character displays, such as cathode ray tubes or liquid crystals may be utilized within the scope of the present invention. As disclosed in copending U.S. patent application Ser. No. 379,755, filed May 19, 1982, character display 24 is connected to electronic circuitry (not shown) which automatically generates a coding scheme in the form of an apparently random sequence of character locations, which cause the individual light emitting diodes 26 of character display 24 to display the randomly generated characters in association with particular actuation sites 28 of switching assembly 18 in that same apparently random sequence. As noted previously, the alphanumeric character display is preferably randomized in such a manner that a bystander is unable to observe which character is associated with which actuation site, so that even if a bystander were to observe which keys or sites were activated by the user, he still would not know what data was being input by the user. Thus, the sequence of data input cannot be observed and therefore will remain uncompromised. This feature is particularly useful for relatively short data sequences, such as secret code numbers frequently associated with automatic bank tellers and building security entry systems.

Optical grid 22 is incorporated within device 10 to further enhance the security of data input by restricting the view of the underlying character display 24 and its randomly generated sequence of value denoting alphanumeric characters. In the preferred embodiment, optical grid 22 is formed of a plurality of parallel transparent plates which are arranged in a multilayer laminate supported by brackets 30. Each plate maybe approximately 3/100ths of an inch in thickness and is provided with a very thin opaque layer such that the multiplate laminate operates as a collimating grid that restricts the viewing angle of the underlying character display 24. Each of the plates in optical grid 22 will extend vertically when mounted for operation by a user such that the user will be viewing the underlying characters of display 24 through the edges of the multiple transparent plates, each plate separated by an opaque layer. When a user is standing in front of data input device 10, close enough to operate the device and to view the character disply, the character display viewing angle is such that the body and head of the user will prevent others from observing the character display. More specifically, the character display 24 cannot be viewed from an angle of more than approximately 10 degrees from vertical. In addition, it is contemplated that a photocell (not shown) may be utilized to reduce the intensity of character display 24 when ambient illumination is low, to avoid a "light pipe" effect of the optical grid 22 which could possibly transmit the character display to the surface of keyboard 16, where it could be viewed by an unauthorized user. Because switching assembly 18 is mounted above optical grid 22 and is both transparent and pressure sensitive, the moving parts associated with conventional keyboards are absent and thus an unobstructed view of underlying character display 24, is afforded the user.

Transparent backing plate 20 is positioned directly above optical grid 22 and functions to support the relatively sensitive switching assembly 18 and also to provide a firm, uniform operating surface which is necessary for the proper functioning of pressure sensitive actuation sites 28 in switching assembly 18. While it is contemplated that optical grid 22 could also serve this purpose, it is preferred that backing plate 20 be utilized as it greatly simplifies the construction of optical grid 22 by eliminating the need for a planar surface formed of the ends of the multiple transparent plates of grid 22. It should be noted at this point, that backing plate 20 may be provided with holes for a variety of purposes. In the preferred embodiment a plurality of holes 32 are provided for mounting an array of indicator lights (not shown) and a separate hole 34 is provided near the periphery of plate 20 as part of an antitampering system which will be discussed in detail below.

Switching assembly 18 is isolated from direct exposure to the exterior environment in which it is contemplated that data input device 10 will operate, by the overlying unitary flexible keyboard 16. Keyboard 16 serves a dual purpose by providing an effective environmental seal as well as an operating surface for data input by a user of device 10. The operating surface is provided by an array of separated input keys 36 formed in the upper surface of keyboard 16 so as to protrude through cutout 14 in frame 12 when data input device 10 is fully assembled. Input keys 36 are positioned in an array that corresponds to the arrangement of the underlying array of actuation sites 28 of switching assembly 18 and light emitting diodes 26 of character display 24 so that each individual input key will activate one pressure sensitive actuation site 28 to input data corresponding in significance or value to the underlying character display associated with that site. To insure proper orientation of keys 36 and actuation sites 28, corresponding notches 38 and 40 are provided in keyboard 16 and switching assembly 18, respectively, as indexing marks. Thus, it can be seen that keyboard 16 provides a keyboard that operates like a conventional multi-element, individual input key keyboard, yet does so with a single unitary piece having no moving parts or seams which can wear out or permit environmental contamination or short-circuiting of the underlying input device components. Therefore, input device 10 will be readily accepted by the operating public because its environmentally protected design and data security features do not interfere with or significantly modify the normal keyboard operation with which the operating public is familiar.

Figure 4:
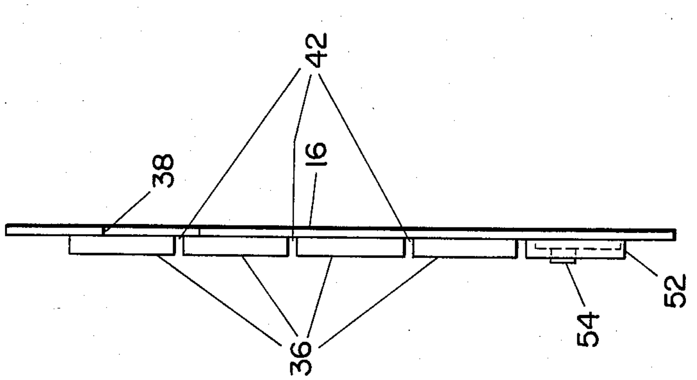
FIG. 4 is a side view of the unitary flexible keyboard panel of FIG. 2 illustrating the configuration of the individual input keys.
Figure 2:
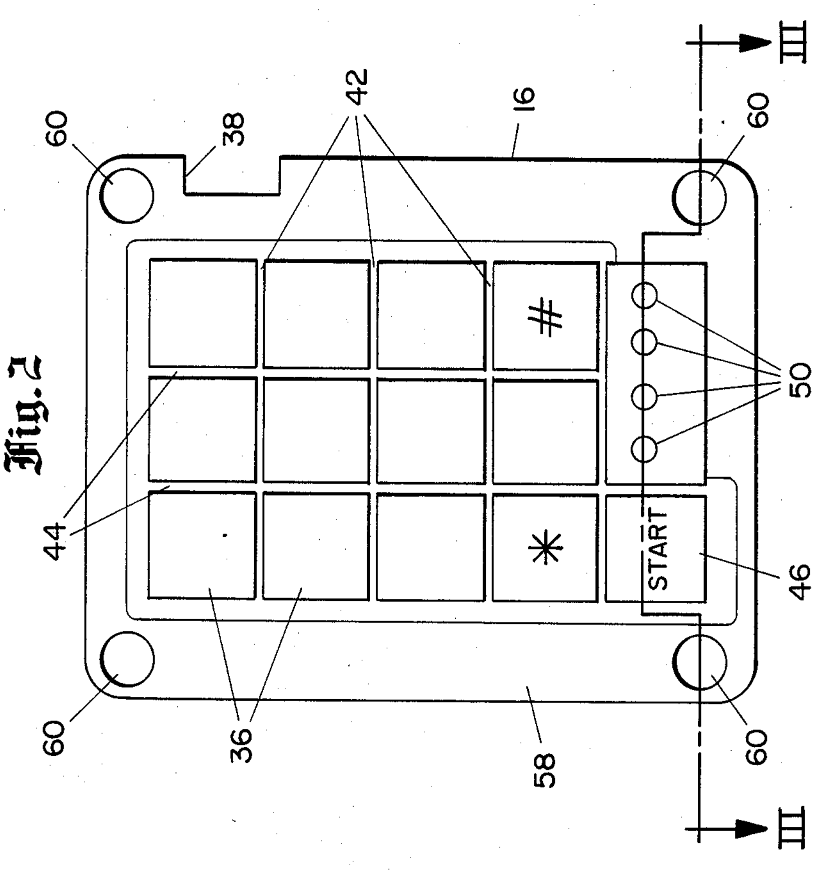
FIG. 2 is a top view of the unitary flexible keyboard panel of the present invention illustrating the placement of the individual input keys.

Referring now to FIGS. 2 and 4, it can be seen that input keys 36 are formed of thickened portions of the unitary flexible keyboard 16. Keys 36 are arranged in a conventional 12 digit keyboard or key pad format similar to that in use on so-called "Touch-Tone" type keyboard telephones and adding machines. However, it is contemplated that keys 36 may be arranged in a variety of positions for various functions. For example, rather than a three column array as shown in FIG. 2, a one or two column array could be utilized. Horizontal and vertical separations, 42 and 44, respectively, are formed in the surface of keyboard 16 to provide a degree of separation between the thickened portions forming keys 36 to aid a user in the input operation process by oeparating the individual keys. While it is preferred that the character displays associated with the individual keys are generated in a random sequence as described above, it is contemplated that permanent indicia may be affixed to the surface of various keys to denote a consistent function such as a reset key or "clear" key (not shown).

Figure 3:
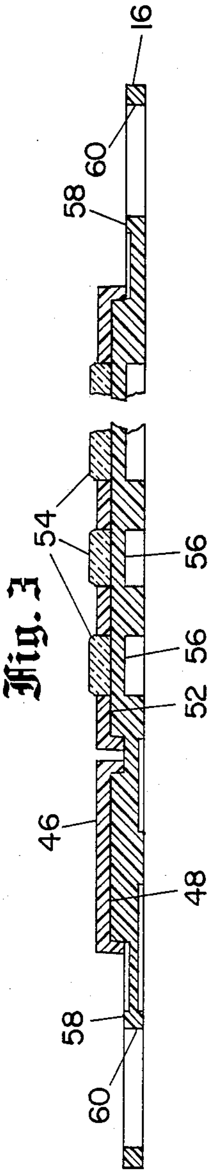
FIG. 3 is an enlarged, fragmentary cross-sectional view of the unitary flexible keyboard panel of FIG. 2 taken along line III—III of FIG. 2.

Additionally, it is preferred that a start button 46 be provided on keyboard 16 to initiate the data input sequence of device 10. As shown in FIG. 3, an opaque cap 48 is preferably affixed to the thickened portion of keyboard 16 forming start button 46, to differentiate button 46 from input keys 36. It is contemplated that similar opaque caps can be positioned at various locations on keyboard 16 when necessary for differentiating specific functions of device 10. Further, it is preferred that an array of indicator lights 50 be provided on keyboard 16 to give feedback representative of the various operating states of input device 10 to the user. For example, in an alarm system a red light could be utilized to indicate that the system was armed and in service for the detection of unauthorized entry; the green light could indicate that the system was set for arming; and yellow lights would indicate that certain doors or windows were open. The various lights could of course indicate other functions and states of the system, for other applications. As is shown in FIG. 3 and FIG. 4, indicator lights 50 are affixed to a thickened portion of keyboard 16 with an opaque cap 52 having lenses 54. Each lens 54 is positioned over a corresponding recess 56 formed in the underside of keyboard 16 to reduce the amount of material through which light must pass to avoid dimming or diffusion of indicator lights 50. This construction of start button 46 and indicator lights 50 utilizing opaque caps 48 and 52 is preferred because it eliminates the need to puncture or cut keyboard 16 and therefore avoids the possibility of creating a gap in the environmental isolating shield formed by keyboard 16. It will be appreciated that opaque caps 48 and 52 may be constructed to match the material of frame 12 as shown in FIG. 1.

To insure an effective, weather resistant seal, keyboard 16 is provided with an uninterrupted peripheral gasket 58. As shown in FIG. 3, gasket 58 is formed as an integral part of keyboard 16, comprising a thickened area about the perimeter of the keyboard. This gasket configuration is preferred because it simplifies the construction and assembly of input device 10 and also eliminates one of the sealing surfaces which would be associated with a conventional separate gasket. Mounting holes 60 are provided in gasket 58 to enable interior fasteners (not shown) to be utilized to clamp frame 12 into a secure, sealing engagement atop keyboard 16 to effectively seal out environmental contaminants. Additionally, this fastening arrangement also serves to provide a clean exterior face on device 10 which, being devoid of fasteners, is therefore resistant to tampering. The position of holes 60 within gasket 58 is preferred because it serves to prevent leakage about the fasteners by surrounding each with sealing gasket material. It will be appreciated that other forms of assembly may be utilized such as clamps or external fasteners, but the arrangement disclosed is preferred for the reasons stated above.

Figure 6:
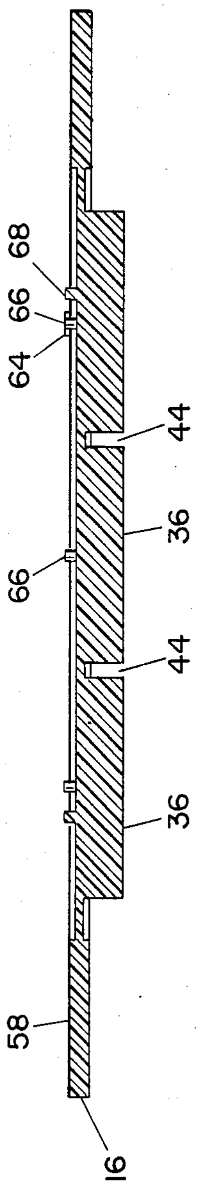
FIG. 6 is an enlarged cross-sectional view of the unitary flexible keyboard panel of FIG. 5 taken along line VI—VI and illustrating the integral gasket surfaces of the keyboard panel.
Figure 5:
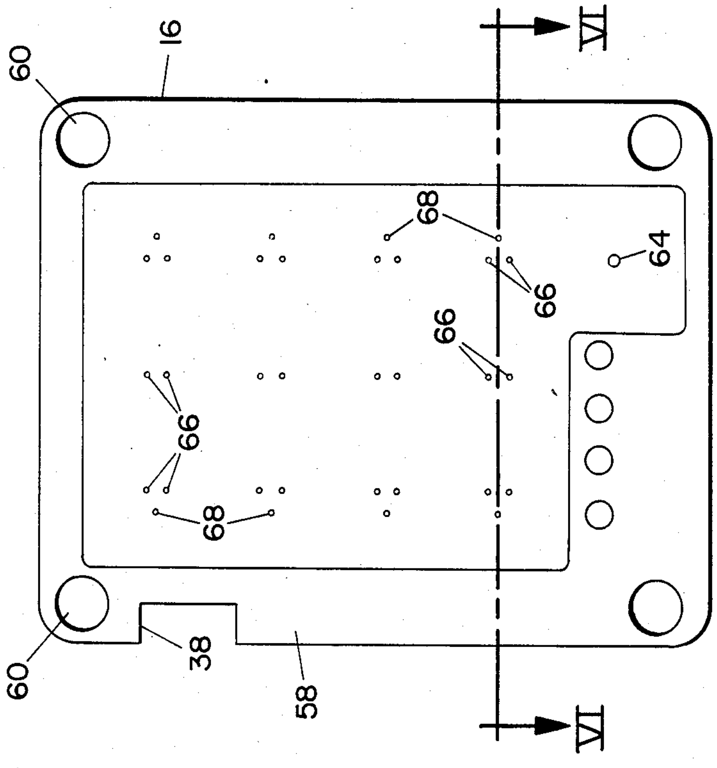
FIG. 5 is a bottom view of the unitary flexible keyboard panel of the present invention and illustrates the preferred placement of the actuating pins.

Referring now to FIG. 5 and FIG. 6, the underside of the keyboard 16 also forms peripheral gasket 58 which, because of its thickened cross-sectional area, defines a recessed area 12 underlying the individual input keys 36 and start button 46 located on the top of keyboard 16 as shown in FIGS. 2, 3 and 4. Also visible in FIG. 5 are recesses 56 positioned below indicator lights 50, as discussed above. Actuating pins 64, 66 and 68 are shown protruding from a recessed area on the side of keyboard-gasket member 16 away from the raised key areas 36. Pins 66 are grouped in pairs, each pair preferrably being vertically aligned and located below the center of an individual input key 36, such that each key is positioned directly above one pair of pins 64. When a user presses an input key, its associated pair of actuating pins 64 will concentrate the pressure exerted, by focusing it into the much smaller surface area of the actuating pin pair, and transmit this concentrated force to the corresponding actuation site in the underlying switching assembly to activate the pressure sensitive actuation site. As a result of this concentration and focusing, the user of date input device 10 need only exert a relatively light pressure upon input keys 36 to activate the associated underlying actuation sites.

The material forming the unitary flexible keyboard 16 is preferably a urethane type of material having a Shore value of 80 on the A scale. Incidentally, "Shore" values are a measure of stiffness or hardness, and a "Shore" value of 90 would be stiffer than a value of 80. The so-called "A" scale is used to measure softer or more flexible materials, and the "D" scale is used for harder materials. Returning to keyboard 16, as a result of this relatively high degree of flexibility the utilization of multiple pins 66 and 68 is desirable to insure that the underlying actuation site receives sufficient localized pressure to activate it and no other actuation site. Pins 68 are provided on the outside edge of each peripheral column of actuation keys because it has been found that users tend to exert pressure near the periphery, as opposed to the center, of the input keys located near the edges of the input keyboard. The use of the pins provides the additional benefit of preventing "interkey bleed" when adjacent keys are simultaneously pressed or when pressure is exerted between keys, such as upon horizontal separations 44. Start button 46, because it is provided with a relatively rigid opaque cap 48, as described above, does not possess the flexibility of input keys 26 and therefore a single actuation pin 64 is sufficient for focusing and translating the pressure exerted on start button 46 to its underlying actuation site. Also, because start button 46 is located away from input keys 36, its rigidity does not result in interkey bleed problems. It will be appreciated that the small diameter of actuating pin 66 and 68 results in a distortion free view of the underlying value denoting character display of each input key.

Figure 7:
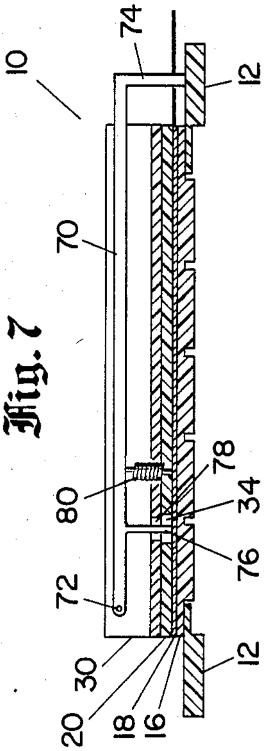
FIG. 7 is a partly sectional side view showing the antitampering device.
Figure 8:
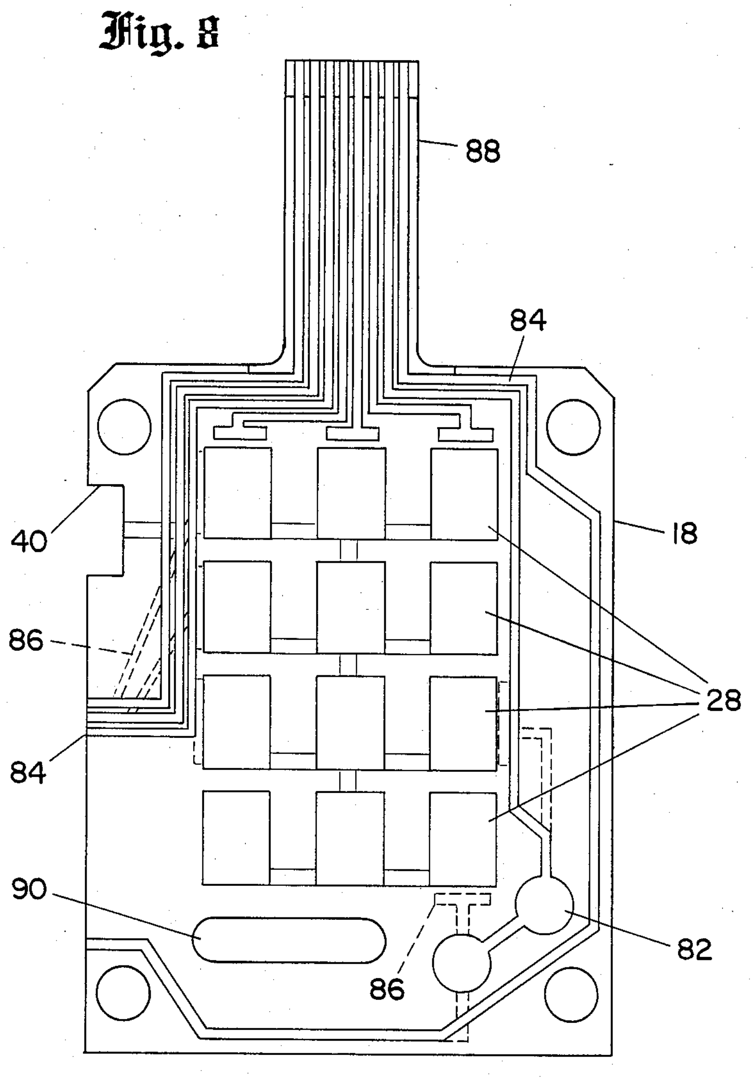
FIG. 8 is a top view of the transparent switching assembly illustrating the placement of the individual actuation locations and associated circuitry.

In FIG. 7, a preferred embodiment of the antitampering means of the present invention is shown. Preferably, the antitampering means comprises an elongated member 70 which is positioned alongside bracket 30 in a roughly parallel orientation to keyboard 16. One end of member 70 is movably mounted upon a pivot 72 attached to bracket 30 and the other end of member 70 is bent to form a contact arm 74 which abuts the back of frame 12. A finger 76 extends from elongated member 70 in a roughly parallel orientation to contact arm 74. Finger 76 is slightly shorter in length than contact arm 74 and extends through a hole 78 in bracket 30 and an underlying hole 34 in backing plate 20 to a point just above switching assembly 18. Extension spring 80 is provided to bias member 70 toward keyboard 16. Because contact arm 74 is slightly longer than finger 76, arm 74 abuts against the back of frame 12, resists the biasing of spring 80, and thereby prevents finger 76 from exerting pressure upon switching assembly 18. Thus, if frame 12 is removed from input device 10 elongated member 70 is free to move under the influence of spring 80 about pivot 72, forcing finger 76 against switching assembly 18. As shown in FIG. 8, a shutoff actuation switch 82 is located on switching assembly 18 in a position directly behind holes 34 and 78 so that pressure exerted by finger 76 on shutoff site 82 when frame 12 is removed will activate site 82 to complete a circuit that is programmed to shut off the operation of input device 10 and its associated functions.

In FIG. 8, transparent switching assembly 18 having multiple actuation sites 28 is shown. Sites 28 are arranged to correspond to the placement of keys 36 on flexible keyboard 16 as discussed above. Because the value denoting alphanumeric characters are displayed below each activation site, it is necessary that destortion free viewing of the underlying characters be provided. Therefore, activation sites 28 are preferably formed of parallel layers of transparent conducting material such as indium oxide or tin oxide that are separated by a small air space, such that pressure exerted upon one or both layers will deform the layers into contact with one another and thus complete a conducting circuit which can be sensed as data input. It will be appreciated that the associated circuitry, as indicated by solid strips 84 and dashed strips 86 must be carried by switching assembly 18 in a location that will not interfere with viewing of the underlying character display. For purposes of explanation, dashed strips 86 represent conducting circuitry carried on the back of switching assembly 18; whereas, solid strips 84 represent conducting circuitry on the front surface of switching assembly 18. The printed circuitry composed of strips 84 and 86 is formed to converge at a multistrip conducting ribbon cable 88 which enables data input device 18 to be assembled as a completed subunit which can then be conveniently connected by ribbon cable 88 to a data utilization system such as an automated bank teller or building security entrance system.

Switching assembly 18 is provided with an indexing notch 40, as discussed above, to facilitate assembly of data input device 10 by providing an orientation reference for the proper positioning of switching assembly 18 with respect to keyboard 16. Notch 40 serves to prevent the accidental positioning of the transparent, relatively symmetrical switching assembly in an inverted position, wherein actuation sites 28 would be incorrectly aligned with the associated input keys 36. Additionally, a slot 90 is provided in switching assembly 18 to enable indicator lights 50 to be properly positioned on keyboard 16. Slot 90 need not be provided if indicator lights are not to be utilized on the input device; however, it is preferred that indicator lights be utilized to assist the user of input device 10 in the operation of the device by providing feedback. Accordingly, slot 90 is provided for this purpose. In addition, it will be appreciated that mounting holes 92, positioned to align with mounting holes 60 in keyboard 16, are provided for mounting switching assembly 18 in proper orientation with respect to keyboard 16.

Figure 9:
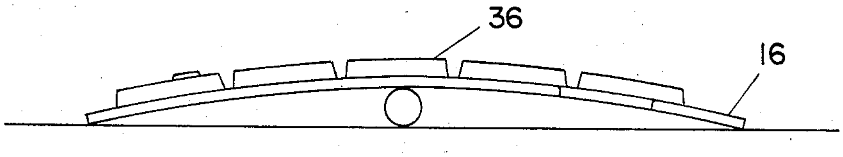
FIG. 9 is a side view of the unitary flexible keyboard panel illustrating the flexibility of the transparent plastic material forming the keyboard panel.

Referring now to FIG. 9, the flexibility of unitary keyboard 16 is illustrated by the curvature of keyboard 16, imparted by its own weight, over a circular cross-section rod, indicated by reference 94. Preferably, keyboard 16 is formed of a urethane type material having a Shore of 80 on the A, round tool scale; however, other transparent materials having similar flexibility are contemplated as being within the scope of the invention. It will be appreciated, that more rigid materials, such as ABS or polycarbonate and vinyl were found to be too stiff for proper operation of input device 10 as such materials would exhibit "interkey bleed" when adjacent input keys were simultaneously pressed. In addition to providing optically clear, distortion free viewing of the underlying character displays of input device 10, urethane is also capable of withstanding the impact of various implements, such as pencils or writing pens, that the operating public may utilize to activate the invidual keys. Thus, urethane is able to withstand the abuses of operation by an uniformed general public that can be expected to be encountered in the operating environments projected for data input device 10. This durability also serves to provide a degree of protection against intentional vandalism. It should also be appreciated, that in addition to acting as a waterproof seal, urethane has been found to remain flexible after weeks of below freezing temperatures, thereby enabling data input device 10 to remain operational in extreme environments.

For purposes of completeness, the following illustrative dimensions of data input device 10 are provided. Preferably, frame 12 is sized to be on the order of four inches by six inches in rectangular extend and formed of rigid plastic material or metal approximately one quarter inch in thickness. This construction is preferred as it provides a relatively strong frame that can resist the abuses discussed above. Unitary keyboard 16 is formed of a single sheet of urethane plastic approximately 1/32 inch in thickness and three and one half inches by four and one half inches in rectangular extent. Keys 36 are on the order of one eighth inch in thickness and approximately three quarters inch by three quarters inch square; being separated by grooves 42 and 44 which are approximately one sixteenth inch wide and one eighth inch deep. The pins 66 and 68 extend from the bottoms of the key sites by 1/32 of an inch. Peripheral gasket 58 is approximately one sixteenth inch thick and one quarter to one inch wide. It is to be understood that these are illustrative dimensions only and that other dimensions are contemplated as being within the scope of the present invention. It should also be noted that FIG. 2, FIG. 4, and FIG. 5 shown on a scale which is about one half of the enlarged showings of FIG. 3 and FIG. 6.

Thus, from the preceding discussion, it will be appreciated that the present invention provides a secure data input device that is both durable and weather resistant. In addition, the absence of moving parts within the data input device of the present invention serves to increase its service life and to simplify its assembly and manufacture; thereby reducing associated operation costs.

Having thus described an exemplary embodiment of the present invention, it should now be apparent to those skilled in the art that various features, objects, and advantages of the present invention have been attained, and that various modifications, adaptations and equivalent construction may be made in view thereof which still fall within the scope and spirit of the present invention. For example, other forms of antitampering devices may be employed in place of the spring biased member disclosed, or different arrangements of input keys, or various character displays, such as television tubes of liquid crystal readouts may be substituted for those disclosed. Instead of electrically switches which are actually closed, capacitive input circuits may be employed. Also as mentioned above, the flexible keyboard may be used with fixed input data keypads. Accordingly, the present invention is not limited to the precise embodiments described in detail hereinabove and shown in the drawings.

What is claimed is:

1. An environmentally protected secure keyboard display and input device, comprising:

means for providing a variable visual display of alphanumeric characters in an array;

means for restricting the view of said display means to the user of said device;

means for inputting data including a plurality of input actuation sites overlying said display means;

unitary flexible keyboard means having rows and columns of keys for separately and independently activating each of said actuation sites, said keyboard means being formed of transparent flexible material and including a peripheral environmental seal and thickened portions forming input keys overlying each of said actuation sites, said unitary keyboard means having its central area including the spaces between keys being open and free of overlying members including said thickened portions, said unitary keyboard being formed of a material having a hardness of in the order of substantially 80 on the Shore round tool "A" scale to have high impact and abuse resistance and some limited flexibility; said unitary keyboard means being continuous in the central area including the rows and colums of keys; and means including an exterior frame or bezel means for clamping the entire peripheral edges of said keyboard means to underlying portions of said assembly to form a waterproof gasket completely sealing said keyboard means around the entire periphery thereof.

2. The display and input device of claim 1, wherein said keyboard means is formed of transparent urethane.

3. The display and input device of claim 1, wherein said means for inputting data comprises an array of pressure sensitive switches, each of said switches formed of two or more layers of transparent electrical conducting material, said layers being disposed adjacent to but slightly separated from one another, wherein pressure exerted upon said layers will distort said layers into electrically conducting contact.

4. The keyboard display and input device of claim 3, wherein said transparent electrical conducting material includes indium oxide.

5. The display and input device of claim 3, wherein said transparent electrical material conducting material includes tin oxide.

6. The keyboard display and input device of claim 3, wherein said keyboard means includes one or more pin members disposed beneath each of said keys, said pin members serving to focus and concentrate deforming pressure upon said pressure sensitive switches in response to pressure exerted upon said keys by a user of said device.

7. The display and input device of claim 6, wherein said keyboard means is formed of transparent urethane.

8. The display and input device of claim 1, wherein said means for visually displaying alphanumeric characters is an array of light emitting diodes.

9. An environmentally protected secure keyboard display and input device, comprising:

means for providing a variable visual display of alphanumeric characters in an array;

means for restricting the view of said display means to the user of said device;

means for inputting data including a plurality of input actuation sites overlying said display means;

unitary flexible keyboard means for separately and independently activating each of said actuation sites, said keyboard means being formed of transparent flexible material and including a peripheral environmental seal and thickened portions forming input keys overlying each of said actuation sites; and anti-tampering means for turning said device off in response to partial disassembly of said device.

10. The display and input device of claim 9, wherein said antitampering means comprises:

a pressure sensitive shut off switch; and an extending finger biased to engage and activate said pressure sensitive shut off switch in response to partial disassembly of said device.

11. In a secure keyboard display and input device, including a plurality of input actuation sites and corresponding character displays, the improvement comprising:

means for protecting said device from external environmental damage or interference while allowing external actuation of said input actuation sites by an operator of said device, said means for protecting comprising a unitary flexible keyboard having rows and columns of keys sealingly mounted upon said actuation sites;

said unitary keyboard means having its central area including the spaces between keys being open and free of any overlying members, said unitary keyboard being formed of a material having a hardness of in the order of substantially 80 on the Shore round tool "A" scale to have high impact and abuse resistance and some limited flexibility; said unitary keyboard means being continuous in the central area including the rows and columns of keys;

means including an exterior frame or bezel means for clamping the entire peripheral edges of said keyboard to underlying portions of said device to form a waterproof gasket completely sealing said keyboard around the entire periphery thereof.

12. The display and input device of claim 11, wherein said unitary flexible keyboard includes thickened portions forming input keys overlying each of said actuation locations.

13. The display and input device of claim 11, wherein said unitary flexible keyboard is formed of urethane.

14. In a secure keyboard display and input device, including a plurality of input actuation sites and corresponding character displays, the improvement comprising:

means for protecting said device from external environmental damage or interference while allowing external actuation of said input actuation sites by an operator of said device, said means for protecting comprising a unitary flexible keyboard sealingly mounted upon said actuation sites; and anti-tampering means for turning said device off in response to partial disassembly of said device.

15. The display and input device of claim 13, wherein said urethane keyboard is transparent.

16. The display and input device of claim 14, wherein said antitampering means comprises:

a shut off switch disposed adjacent to said input actuation locations; and a pivoting member biased to engage and activate said switch when said frame is removed from said device.

* * * * *